US012669673B2

(12) United States Patent
Zhuang et al.

(10) Patent No.: US 12,669,673 B2
(45) Date of Patent: Jun. 30, 2026

(54) OPTICAL ELEMENT DRIVING MECHANISM COMPRISING A PLURALITY OF DRIVING UNITS EACH HAVING A LEAD-OUT PORTION

(71) Applicant: Actutek Corporation, Taoyuan City (TW)

(72) Inventors: Po-Xiang Zhuang, Taoyuan City (TW); Chao-Yuan Chang, Taoyuan City (TW); Wei-Jhe Shen, Taoyuan City (TW); Sin-Jhong Song, Taoyuan City (TW); Kun-Shih Lin, Taoyuan City (TW); Yi-Ho Chen, Taoyuan City (TW); Chao-Chang Hu, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 271 days.

(21) Appl. No.: 18/400,815

(22) Filed: Dec. 29, 2023

(65) Prior Publication Data

US 2024/0219674 A1 Jul. 4, 2024

Related U.S. Application Data

(60) Provisional application No. 63/436,291, filed on Dec. 30, 2022.

(51) Int. Cl.
| | |
|---|---|
| *G02B 7/04* | (2021.01) |
| *G02B 7/02* | (2021.01) |
| *G02B 7/08* | (2021.01) |
| *G02B 27/64* | (2006.01) |
| *G03B 5/00* | (2021.01) |
| *G03B 13/32* | (2021.01) |
| *G03B 30/00* | (2021.01) |
| *H02K 33/18* | (2006.01) |

(52) U.S. Cl.
CPC .............. *G02B 7/04* (2013.01); *G02B 7/023* (2013.01); *G02B 7/08* (2013.01); *G02B 27/64* (2013.01); *G03B 5/00* (2013.01); *G03B 13/32* (2013.01); *G03B 30/00* (2021.01); *H02K 33/18* (2013.01)

(58) Field of Classification Search
CPC ...................................................... G03B 13/32
See application file for complete search history.

(56) References Cited

U.S. PATENT DOCUMENTS

| | | | |
|---|---|---|---|
| 2020/0209439 A1* | 7/2020 | Hu | G02B 3/14 |
| 2021/0055539 A1* | 2/2021 | Hu | G02B 26/004 |
| 2021/0132328 A1* | 5/2021 | Hu | G02B 27/646 |
| 2021/0223504 A1* | 7/2021 | Hsu | G02B 7/09 |

FOREIGN PATENT DOCUMENTS

CN 216817056 U 6/2022

* cited by examiner

*Primary Examiner* — Paul C Lee

(74) *Attorney, Agent, or Firm* — MUNCY, GEISSLER, OLDS & LOWE, P.C.

(57) ABSTRACT

An optical element driving mechanism, which drives an optical element, includes a movable portion, a fixed portion, a driving assembly, and a circuit assembly. The movable portion is connected to the optical element and is movable relative to the fixed portion. The driving assembly drives the movable portion to move relative to the fixed portion. The circuit assembly is electrically connected to the driving assembly.

17 Claims, 15 Drawing Sheets

T2

T22

T21(T211)

T23

1

OPTICAL ELEMENT DRIVING MECHANISM COMPRISING A PLURALITY OF DRIVING UNITS EACH HAVING A LEAD-OUT PORTION

CROSS REFERENCE TO RELATED APPLICATIONS

The present application claims priority to U.S. Provisional Patent Application No. 63/436,291, filed Dec. 30, 2022, which are incorporated by reference herein in their entirety.

BACKGROUND OF THE INVENTION

Field of the Invention

The present invention relates to a driving mechanism, and more particularly to an optical element driving mechanism.

Description of the Related Art

With the development of science and technology, many electronic devices (such as computers) nowadays have the function of taking pictures or recording videos. However, when an optical element and its driving mechanism are installed in the electronic device, the thickness of the electronic device will increase, which is not conducive to the thinning of the electronic device. In addition, the conventional optical element driving mechanism also has problem of being easily affected by magnetic interference, which causes the operation may not stably. In view of this, how to design an optical element driving mechanism that can be more stable, achieve maximum efficiency, and make electronic devices thinner has become an important issue.

BRIEF SUMMARY OF THE INVENTION

In order to solve the conventional problems described above, the present invention provides an optical element driving mechanism, which drives an optical element, includes a movable portion, a fixed portion, a driving assembly, and a circuit assembly. The movable portion is connected to the optical element and is movable relative to the fixed portion. The driving assembly drives the movable portion to move relative to the fixed portion. The circuit assembly is electrically connected to the driving assembly.

According to some embodiments of the present disclosure, the driving assembly includes a first driving unit, a second driving unit, and a first connecting portion. The first driving unit has a first lead-out portion. The second driving unit has a second lead-out portion. The first driving unit is electrically connected to the second driving unit through the first connecting portion. The fixed portion has a main axis and is a polygonal structure. When viewed along the main axis, the first lead-out portion is located between the first driving unit and the second driving unit. When viewed along the main axis, the first lead-out portion is located at a first corner of the optical element driving mechanism.

According to some embodiments of the present disclosure, when viewed along the main axis, the second lead-out portion is located between the first driving unit and the second driving unit. When viewed along the main axis, the first connection portion is located between the first driving unit and the second driving unit. When viewed along the main axis, the second lead-out portion is located at the first corner. When viewed along the main axis, the first connecting portion is located at the first corner.

According to some embodiments of the present disclosure, the driving assembly further includes a third driving unit, a fourth driving unit, and a second connecting portion. The third driving unit has a third lead-out portion. The fourth driving unit has a fourth lead-out portion. The third driving unit is electrically connected to the fourth driving unit through the second connecting portion. When viewed along the main axis, the third lead-out portion is located at a third corner of the optical element driving mechanism.

According to some embodiments of the present disclosure, when viewed along the main axis, the fourth lead-out portion is located at the third corner. When viewed along the main axis, the second connecting portion is located at the third corner.

According to some embodiments of the present disclosure, the optical element driving mechanism further includes a position sensing assembly that senses a movement of the movable portion relative to the fixed portion, including a first reference element, a first sensing element, and a balance element. The first sensing element corresponds to the first reference element. The first reference element is a first magnetic element. The balancing element is a second magnetic element.

According to some embodiments of the present disclosure, a volume of the first magnetic element is greater than a volume of the second magnetic element.

According to some embodiments of the present disclosure, when viewed along the main axis, the first magnetic element is located at the third corner. When viewed along the main axis, the second magnetic element is located at the first corner.

According to some embodiments of the present disclosure, when viewed along a direction that is perpendicular to the main axis, the second connecting portion does not overlap the first magnetic element.

According to some embodiments of the present disclosure, when viewed along the direction that is perpendicular to the main axis, the first connecting portion at least partially overlaps the second magnetic element.

According to some embodiments of the present disclosure, when viewed along the main axis, the first connecting portion is at least partially located between the second magnetic element and the movable portion.

According to some embodiments of the present disclosure, the circuit assembly includes a first circuit element, a second circuit element, and a third circuit element. The first circuit element is electrically connected to the first lead-out portion. The second circuit element is electrically connected to the fourth lead-out portion. The second lead-out portion is electrically connected to the third lead-out portion through the third circuit element. When viewed along the main axis, the first circuit element is located at a first side portion of the optical element driving mechanism. When viewed along the main axis, the second circuit element is located at a third side portion of the optical element driving mechanism. When viewed along the main axis, the third circuit element is at least partially located at the first side portion.

According to some embodiments of the present disclosure, the first circuit element, the second circuit element and the third circuit element all have plate-like structures. When viewed along a direction that is perpendicular to the main axis and perpendicular to the first side portion, the first circuit element and the third circuit element at least partially overlap. When viewed along the main axis, the third circuit element is not located at the third side portion.

According to some embodiments of the present disclosure, electric current is input from the first circuit element and sequentially flows through the first lead-out portion, the first driving unit, the first connecting portion, the second driving unit, the second lead-out portion, the third circuit element, the third lead-out portion, the third driving unit, the second connecting portion, the fourth driving unit, the fourth lead-out portion, and the second circuit element According to some embodiments of the present disclosure, the optical element driving mechanism further includes a guiding assembly. The movable portion is movable relative to the fixed portion through the guiding assembly. The guiding assembly includes a first guiding element, a first contacting element, and a second guiding element, and a second contacting element. The first guiding element has a long strip structure extending in a direction that is parallel to the main axis. When viewed along the main axis, the first guiding element is located at a second corner of the optical element driving mechanism. The first contacting element corresponds to the first guiding element and is disposed on the movable portion. The second guiding element has a long strip structure extending in a direction that is parallel to the main axis. When viewed along the main axis, the second guiding element is located at a fourth corner of the optical element driving mechanism. The second contacting element corresponds to the second guiding element and is disposed on the movable portion. The second corner and the fourth corner are opposite to each other. The first side portion is located between the first corner and the second corner.

According to some embodiments of the present disclosure, the first contacting element includes a first contacting portion, a second contacting portion, and a first avoidance portion. The second contacting portion and the first contacting portion are arranged along a direction that is parallel to the main axis. The first avoidance portion has a recessed structure, does not contact the first guiding element, and is located between the first contacting portion and the second contacting portion.

According to some embodiments of the present disclosure, the first contacting portion includes a first contacting surface, a second contacting surface, and a first curved surface. The first contacting surface corresponds to the first guiding element. The second contacting surface corresponds to the first guiding element and faces a direction that is different from the first contacting surface faces. The first contacting surface is connected to the second contacting surface via the first curved surface. When viewed along the direction that is parallel to the main axis, the first guiding element has a first arc edge, and a radius of curvature of the first arc edge is different from a radius of curvature of the first curved surface.

According to some embodiments of the present disclosure, the radius of curvature of the first arc edge is greater than the radius of curvature of the first curved surface.

According to some embodiments of the present disclosure, the second contacting element includes a third contacting portion, a second avoidance portion, and a third avoidance portion. The third contacting portion corresponds to the second guiding element. The second avoidance portion has a recessed structure and does not contact the second guiding element. The third avoidance portion has a recessed structure and does not contact the second guiding element. The third contacting portion is located between the second avoidance portion and the third avoidance portion.

According to some embodiments of the present disclosure, the third contacting portion further includes a fifth contacting surface corresponding to the second guiding element, and the fifth contacting surface and the first contacting surface face different directions. The fifth contacting surface and the second contacting surface face different directions.

BRIEF DESCRIPTION OF THE DRAWINGS

Aspects of this disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
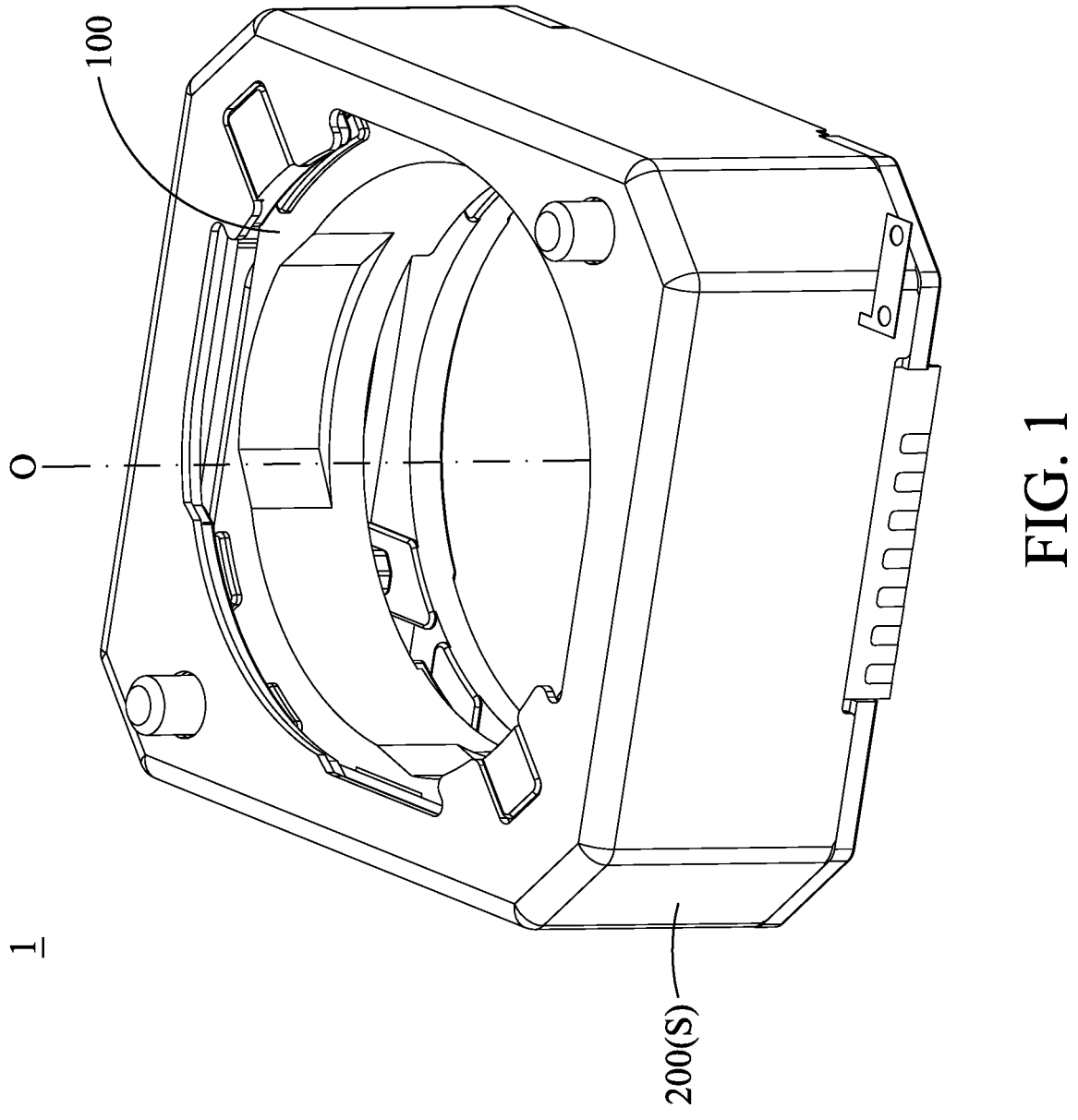
FIG. 1 is a perspective view of an optical element driving mechanism according to an embodiment of the present invention.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

It should be understood that when an element is referred to as being "connected to" or "coupled to" another element, the element may be directly connected or coupled to another element, or there are one or more elements between the two elements. In addition, the use of ordinal numbers such as first, second, and third does not necessarily imply a sense of order, but can be multiple instances to distinguish actions or structures.

Reference to "one embodiment" or "an embodiment" throughout the specification means that particular features, structures, or characteristics described in conjunction with the embodiment are included in at least one embodiment. Therefore, the sentences "in one embodiment" or "in an embodiment" appearing in various places throughout the specification do not necessarily all refer to the same embodiment. In addition, in one or more embodiments, specific features, structures, or characteristics may be combined in any suitable manner.

Figure 2:
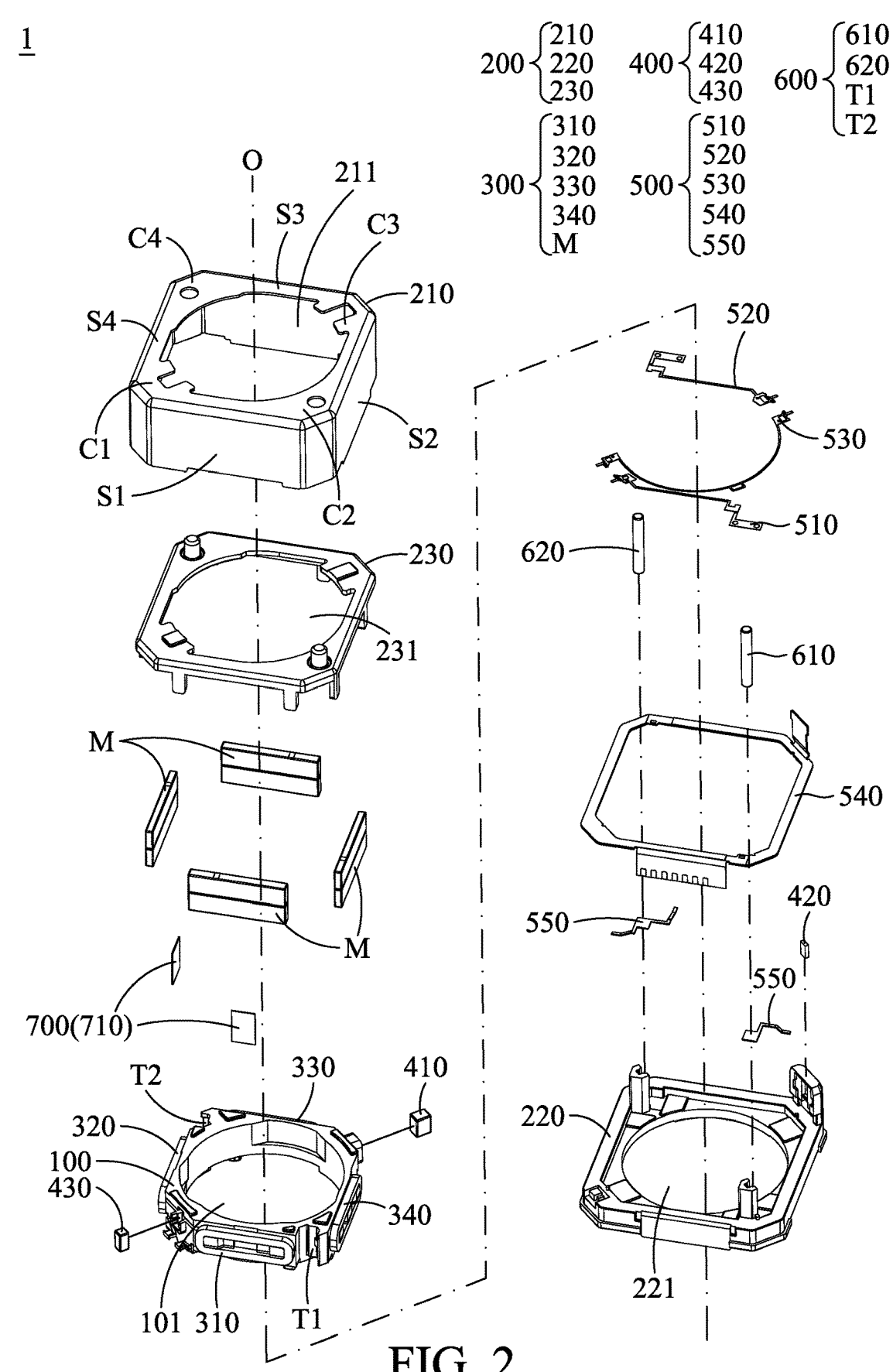
FIG. 2 is an exploded view of the optical element driving mechanism according to an embodiment of the present invention.

Refer to FIG. 1 and FIG. 2, FIG. 1 is a perspective view of an optical element driving mechanism 1 according to an embodiment of the present invention. FIG. 2 is an exploded view of the optical element driving mechanism 1 according to an embodiment of the present invention.

The optical element driving mechanism 1 drives an optical element (not shown), and includes a movable portion 100, a fixed portion 200, a driving assembly 300, a position sensing assembly 400, a circuit assembly 500, a guiding assembly 600, and a magnetically permeable assembly 700.

The movable portion 100 is movable relative to the fixed portion 200, and is connected to the optical element. In more detail, in this embodiment, the movable portion 100 is a holder 100, and the holder 100 has a through hole 101 which enables the optical element arranged in the holder 100. In this embodiment, the optical element may be a lens.

The fixed portion 200 has a main axis O and is a polygonal structure. The fixed portion 200 includes an upper cover 210, a base 220, and a frame 230. The upper cover 210 has an upper cover opening 211. The base 220 has a base opening 221. By combining the upper cover 210 and the base 220, a housing S of the optical element driving mechanism 1 may be formed to protect various elements inside.

It should be understood that a center of the upper cover opening 211 corresponds to an optical axis of the optical element, and the base opening 221 corresponds to an image sensing element (not shown) arranged outside the optical element driving mechanism 1. External light may enter the upper cover 210 through the upper cover opening 211, then pass through the optical element and the base opening 221, and then be received by the image sensing element to generate a digital image signal.

The frame 230 has a frame opening 231. In this embodiment, the holder 100 and the optical element inside are movably arranged in the frame 230.

In this embodiment, in order to clearly illustrate configuration of each element in the optical element driving mechanism 1, the optical element driving mechanism 1 are divided into fourth side portions and four corners when viewed along the main axis O. As shown in FIG. 2, the fourth side portions are respectively a first side portion S1, a second side portion S2, a third side portion S3, a fourth side portion S4, and the four corners are respectively a first corner C1, a second corner C2, a third corner C3, and a fourth corner C4. The first side portion S1 is located between the first corner C1 and the second corner C2. The second side portion S2 is located between the second corner C2 and the third corner C3. The third side portion S3 is located between the third corner C3 and the fourth corner C4. The fourth side portion S4 is located between the fourth corner C4 and the first corner C1. The first corner C1 and the third corner C3 are opposite to each other, and the second corner C2 and the fourth corner C4 are opposite to each other.

Figure 5:
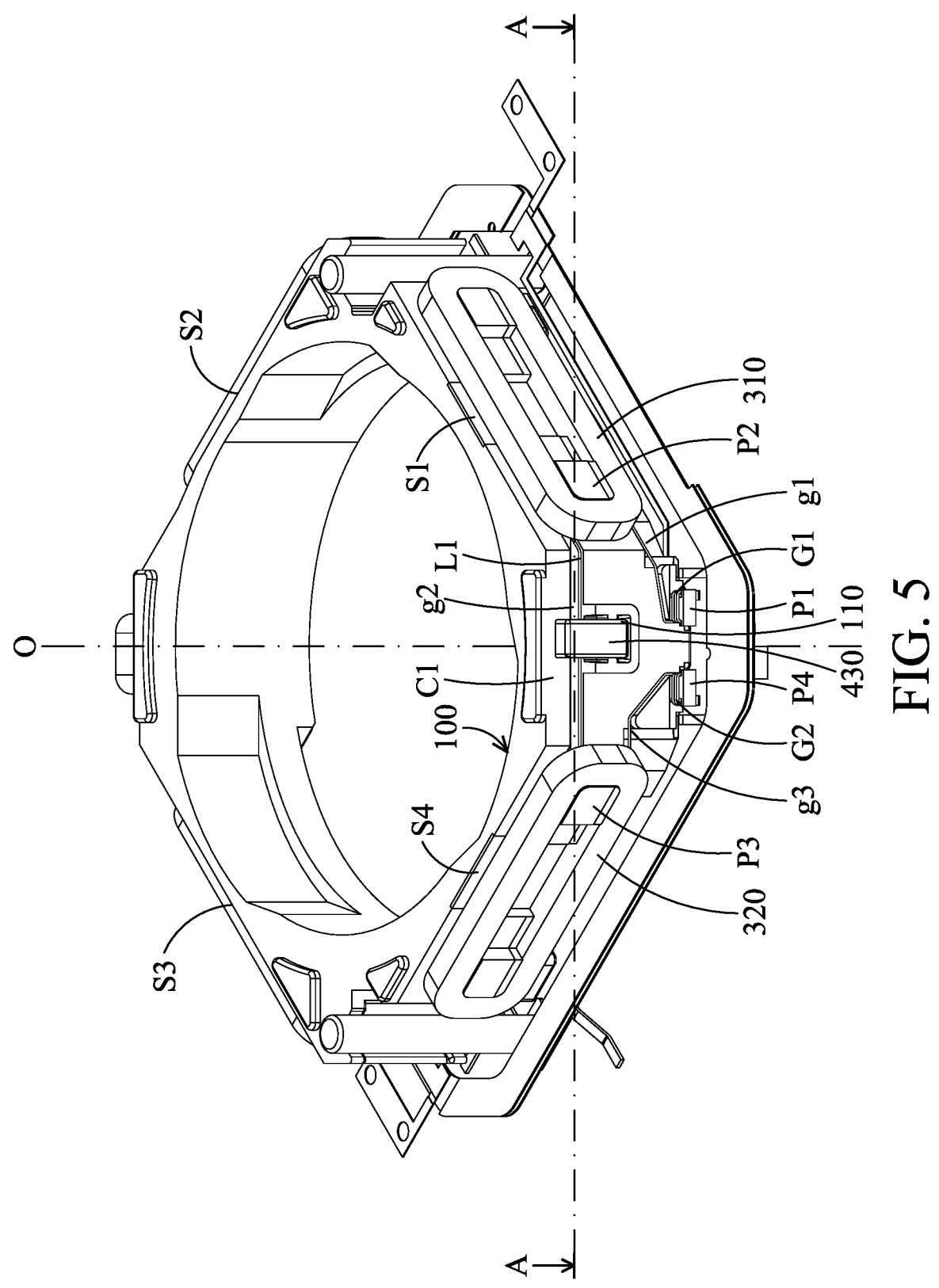
FIG. 5 is a perspective view of a partial structure of the optical element driving mechanism according to an embodiment of the present invention.
Figure 6:
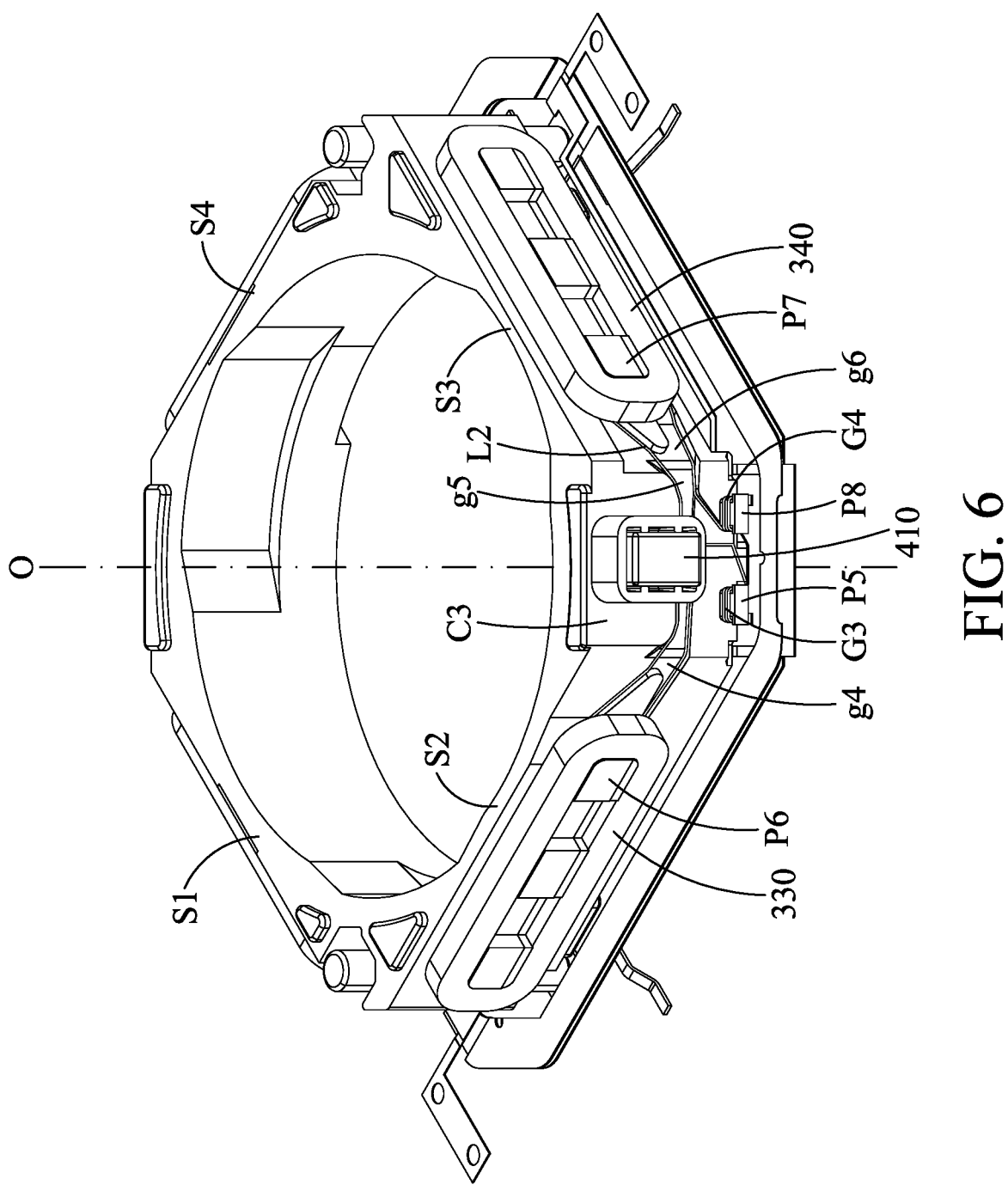
FIG. 6 is another perspective view of a partial structure of the optical element driving mechanism according to an embodiment of the present invention.
Figure 7:
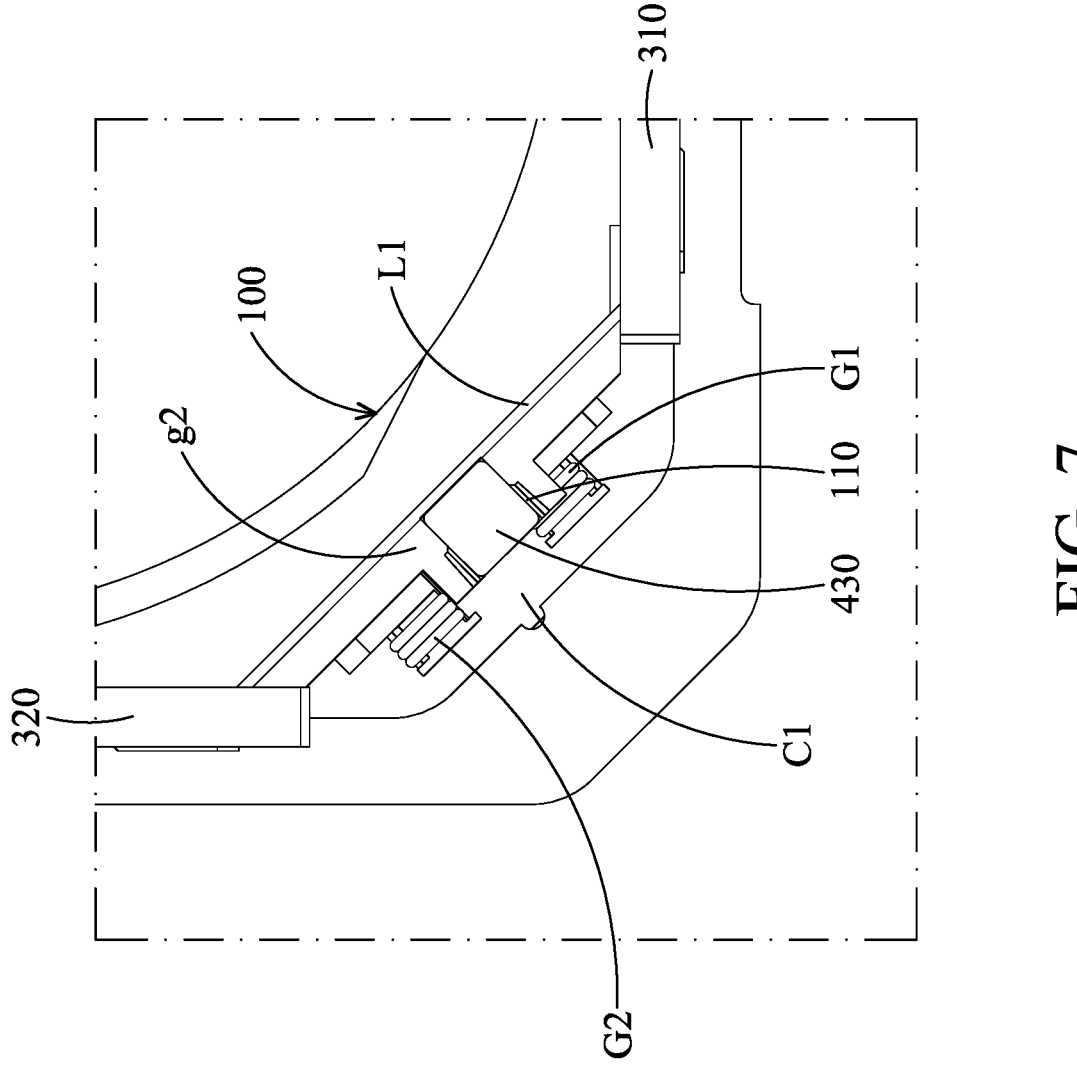
FIG. 7 is an enlarged cross-sectional view of a partial structure illustrated along line A-A in FIG. 5.

Next, refer to FIG. 2, and FIG. 5 to FIG. 7. FIG. 5 and FIG. 6 are perspective views from different angles of a partial structure of the optical element driving mechanism 1 according to an embodiment of the present invention. FIG. 7 is an enlarged cross-sectional view of the partial structure illustrated along line A-A in FIG. 5.

The driving assembly 300 drives the movable portion 100 to move relative to the fixed portion 200. The driving assembly 300 includes a first driving unit 310, a second driving unit 320, a third driving unit 330, a fourth driving unit 340, a first connecting portion L1 (shown in FIG. 5), a second connecting portion L2 (shown in FIG. 6), and four magnetic elements M.

The first driving unit 310, the second driving unit 320, the third driving unit 330, the fourth driving unit 340, the first connecting portion L1, and the second connecting portion L2 are disposed on the movable portion 100. The first driving unit 310 is electrically connected to the second driving unit 320 through the first connecting portion L1, and the third driving unit 330 is electrically connected to the fourth driving unit 340 through the second connecting portion L2. The four magnetic elements M are disposed on the fixed portion 200 and respectively correspond to the four driving units.

In more detail, as shown in FIG. 5, the first driving unit 310, the second driving unit 320, and the first connecting portion L1 may be an integrally formed lead wire, one end portion of the lead wire is a first lead-out portion G1, and the other end of the lead wire is a second lead-out portion G2. The lead wire may be disposed as follows. Winding the first lead-out portion G1 around a protrusion P1 on the holder 100 at the first corner C1, and then extending the lead wire along a groove g1 on the holder 100 at the first corner C1 to the holder 100 at the first side portion S1, and winding the lead wire around a protrusion P2 on the holder 100 at the first side portion S1. Then, extending the lead wire along a groove g2 on the holder 100 at the first corner C1 to the holder 100 at the fourth side portion S4, and winding the lead wire around a protrusion P3 on the holder 100 at the fourth side portion S4. Then, extending the lead wire along a groove g3 on the holder 100 at the first corner C1, and winding the second lead-out portion G2 around a protrusion P4 on the holder 100 at the first corner C1.

When viewed along the main axis O, the first lead-out portion G1 is located between the first driving unit 310 and the second driving unit 320, the second lead-out portion G2 is located between the first driving unit 310 and the second driving unit 320, the first connecting portion L1 is located between the first driving unit 310 and the second driving unit 320, the first lead-out portion G1 is located at the first corner C1, the second lead-out portion G2 is located at the first corner C1, and the first connecting portion L1 is located at the first corner C1.

On the other hand, similar to configuration of the first driving unit 310, the second driving unit 320, and the first connecting portion L1, as shown in FIG. 6, the third driving unit 330, the fourth driving unit 340, and the second connecting portion L2 may be another integrally formed lead wire. One end portion of the lead wire is a third lead-out portion G3, and the other end of the lead wire is a fourth lead-out portion G4. The lead wire may be disposed as follows. Winding the third lead-out portion G3 around a protrusion P5 on the holder 100 at the third corner C3, and then extending the lead wire along a groove g4 on the holder 100 at the third corner C3 to the holder 100 at the second side portion S2, and winding the lead wire around a protrusion P6 on the holder 100 at the second side portion S2. Then, extending the lead wire along a groove g5 on the holder 100 at the third corner C3 to the holder 100 at the third side portion S3, and winding the lead wire around a protrusion P7 on the holder 100 at the third side portion S3. Then, extending the lead wire along a groove g6 on the holder 100 at the third corner C3, and winding the fourth lead-out portion G4 around a protrusion P8 on the holder 100 at the third corner C3.

When viewed along the main axis O, the third lead-out portion G3 is located between the third driving unit 330 and the fourth driving unit 340, the fourth lead-out portion G4 is located between the third driving unit 330 and the fourth driving unit 340, the second connecting portion L2 is located between the third driving unit 330 and the fourth driving unit 340, the third lead-out portion G3 is located at the third corner C3, the fourth lead-out portion G4 is located at the third corner C3, and the second connecting portion L2 is located at the third corner C3.

However, the present invention is not limited to this. Each driving unit and the connecting portion may also be composed of different lead lines. For example, the first driving unit 310, the second driving unit 320, and the first connecting portion L1 are composed of three lead lines. The first driving unit 310 has two end portions, one end portion is the first lead-out portion G1, and the other end portion is connected to one end portion of the first connecting portion L1. The second driving unit 320 has two end portions, one end portion is the second lead-out portion G2, and the other end portion is connected to the other end portion of the first connecting portion L1.

As shown in FIG. 2, FIG. 5 and FIG. 6, the position sensing assembly 400 senses movements of the movable portion 100 relative to the fixed portion 200, and includes a first reference element 410, a first sensing element 420, and a balancing element 430. The first sensing element 420 corresponds to the first reference element 410.

Specifically, the first reference element 410 may be, for example, a Hall magnet, which is disposed on the holder 100. The first sensing element 420 may be, for example, a Hall effect sensor, a magnetoresistance sensor, or a Fluxgate, which is disposed on the base 220 to sense magnetic field of the first reference element 410 on the holder 100 in order to obtain position of the holder 100 relative to the base 220.

The balance element 430 is disposed on the holder 100, and is disposed at a diagonal position to the first reference element 410. When viewed along the main axis O, the first reference element 410 is located at the third corner C3, and the balance element 430 is located at the first corner C1. In this embodiment, the first reference element 410 is a first magnetic element 410, and the balancing element 430 is a second magnetic element 430. A volume of the first magnetic element 410 is greater than a volume of the second magnetic element 430.

Through the configuration and size relationship between the first reference element 410 and the balance element 430 described above, the balance element 430 may offset a magnetic force generated by the magnetic element M and the first reference element 410. Therefore, it can be avoided that the first reference element 410 acting as the Hall magnet is subject to magnetic interference from the adjacent magnetic element M and then causes the holder 100 to operate unstable or even flip over.

As shown in FIG. 5 and FIG. 7, the second magnetic element 430 is disposed on a receiving portion 110 of the holder 100. When viewed along the main axis O, the first connecting portion L is at least partially located at the second magnetic element 430 and the movable portion 100. When viewed along a direction that is perpendicular to the main axis O, the first connecting portion L1 at least partially overlaps the second magnetic element 430. That is, the groove g2 is recessed toward the main axis O than the receiving portion 110. Therefore, the first connecting portion L1 may be disposed closer to the main axis O than the second magnetic element 430, thereby fully utilizing a space of the first corner C1. Furthermore, the optical element driving mechanism 1 may be miniaturized. In addition, the first connecting portion L1 does not overlap or contact the first lead-out portion G1 and the second lead-out portion G2.

On the other hand, as shown in FIG. 6, when viewed along a direction that is perpendicular to the main axis O, the second connecting portion L2 does not overlap the first magnetic element 410. That is, the second connecting portion L2 is arranged in the groove g5 below the first magnetic element 410.

Figure 3:
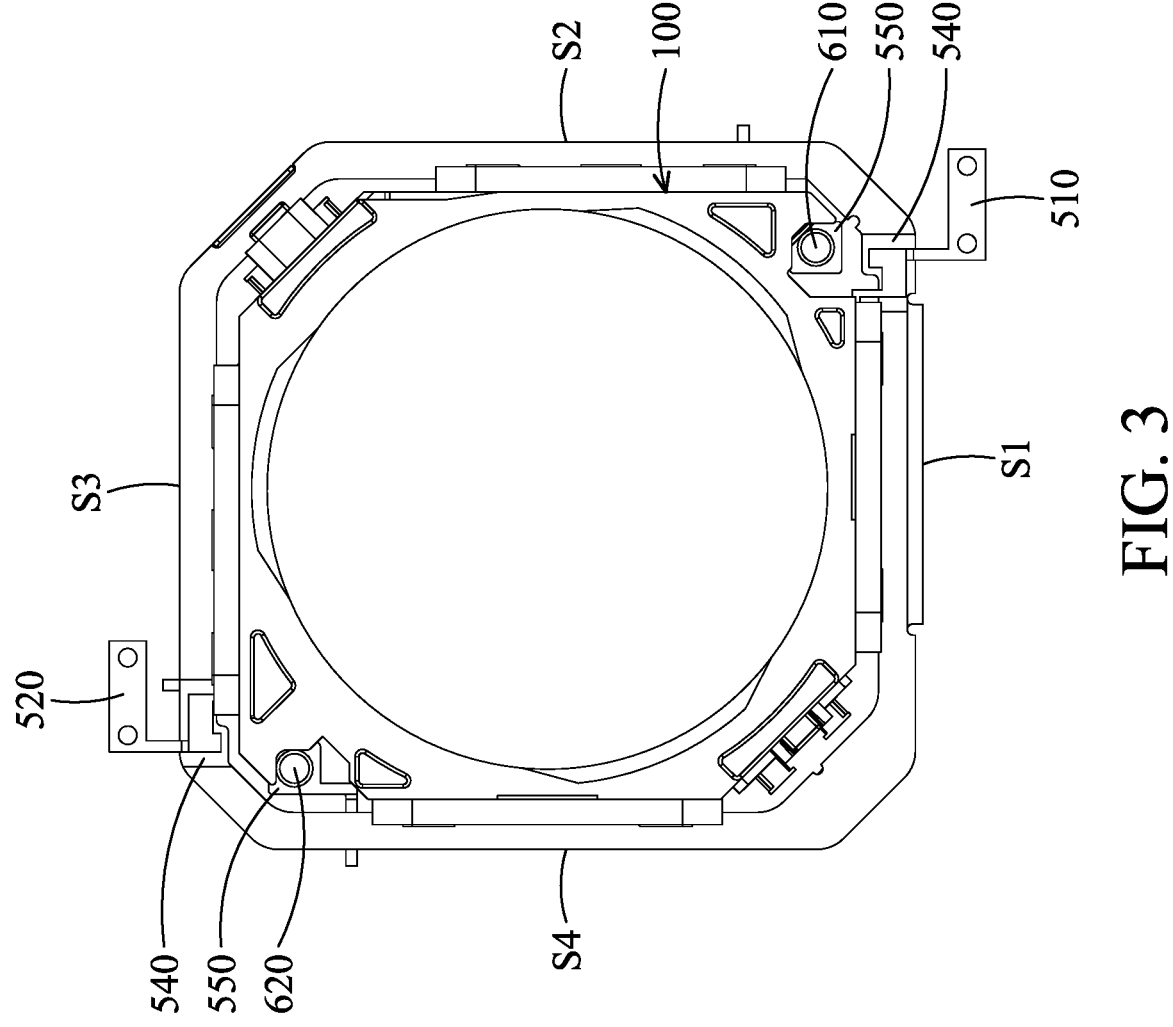
FIG. 3 is a top view of a partial structure of the optical element driving mechanism according to an embodiment of the present invention.
Figure 4:
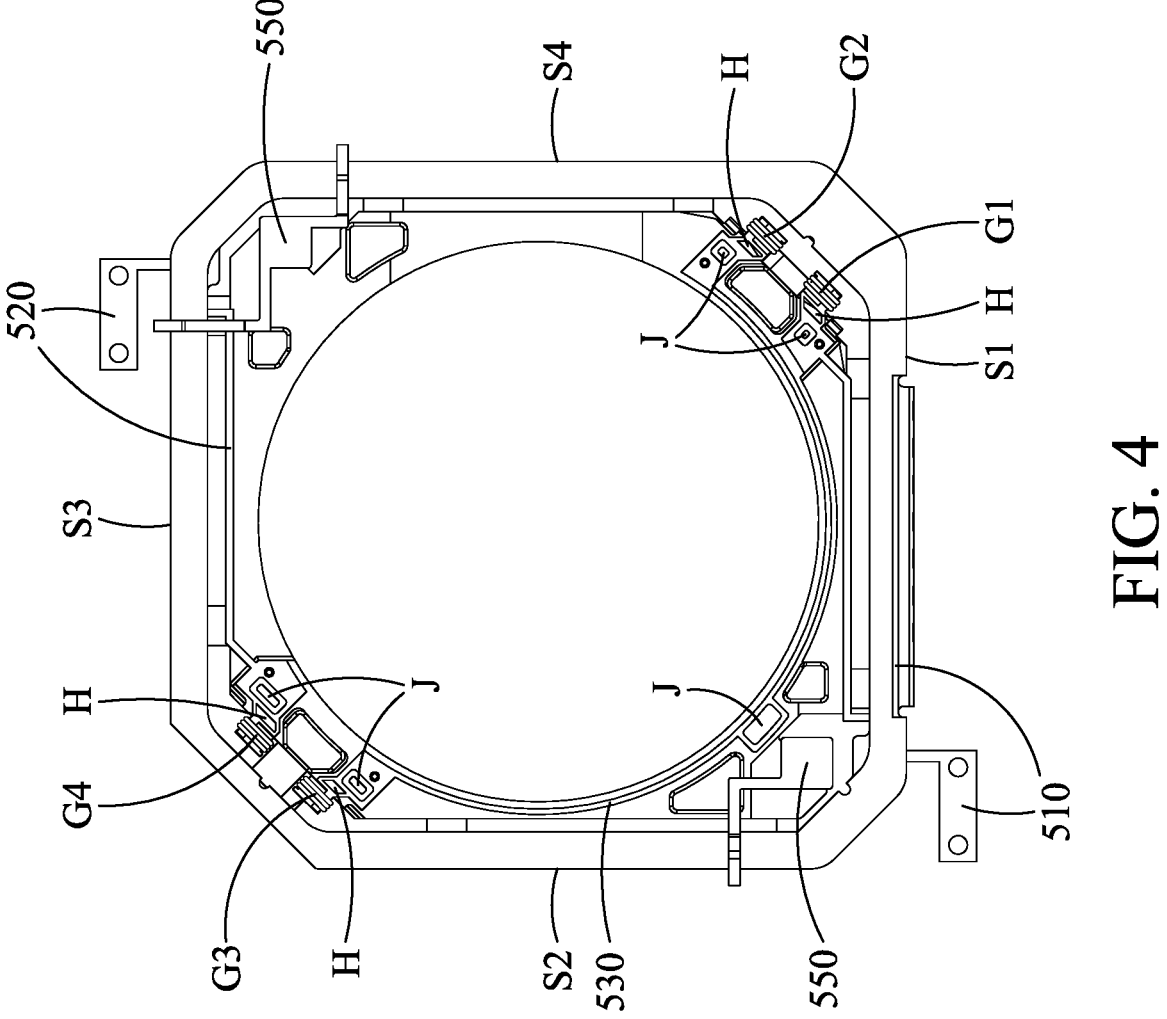
FIG. 4 is a bottom view of a partial structure of the optical element driving mechanism according to an embodiment of the present invention.

Next, refer to FIG. 2 to FIG. 4, FIG. 3 and FIG. 4 are top view and bottom view of a partial structure of the optical element driving mechanism 1 according to an embodiment of the present invention. The circuit assembly 500 is electrically connected to the driving assembly 300. The circuit assembly 500 includes a first circuit element 510, a second circuit element 520, a third circuit element 530, a circuit board 540, and two circuit components 550. The first circuit element 510, the second circuit element 520, and the third circuit element 530 all have a plate-like structure. In this embodiment, the first circuit element 510, the second circuit element 520, and the third circuit element 530 are metal spring leaf. The circuit board 540 is disposed on the base 220 of the fixed portion 200. Two circuit components 550 are embedded in the base 220 and respectively connected to a first guiding element 610 and a second guiding element 620 of the guiding assembly 600. Each of the two circuit components 550 may be respectively connected to an external circuit through different sides.

One end of the first circuit element 510 is connected to the fixed portion 200, more specifically, to the circuit board 540, and may be connected to an external circuit from the first side portion S1. The other end of the first circuit element 510 is connected to the movable portion 100 and is electrically connected to the first lead-out portion G1. One end of the second circuit element 520 is connected to the circuit board 540 and may be grounded from the third side portion S3. The other end of the second circuit element 520 is connected to the movable portion 100 and is electrically connected to the fourth lead-out portion G4. Both ends of the third circuit element 530 are connected to the movable portion 100, one end is electrically connected to the second lead-out portion G2, and the other end is electrically connected to the third lead-out portion G3.

As shown in FIG. 4, a plurality of glue-filling portions J are disposed on the holder 100. By filling the glue-filling portions J with glue, the first circuit element 510, the second circuit element 520, and the third circuit element 530 are connected to the holder 100.

As described above, the first circuit element 510 is electrically connected to the first lead-out portion G1, the second circuit element 520 is electrically connected to the fourth lead-out portion G4, and the third circuit element 530 is electrically connected to the second lead-out portion G2 and the third lead-out portion G3. In some embodiments, these circuit elements and these lead-out portions may be welded by laser, and as shown in FIG. 4, holes can be disposed near welding points of each circuit element to form heat-insulating portions H in order to avoid other elements being affected via heat conduction during high-temperature welding by laser.

One end of the first circuit element 510 is connected to the external circuit, and the other end of the first circuit element 510 is electrically connected to the first lead-out portion G1. One end of the second circuit element 520 is grounded, and the other end of the second circuit element 520 is electrically connected to the fourth lead-out portion G4. The second lead-out portion G2 is electrically connected to the third lead-out portion G3 through the third circuit element 530. Therefore, with this configuration described above, electric current may be input from the first circuit element 510 and sequentially flowed through the first lead-out portion G1, the first driving unit 310, the first connecting portion L1, the second driving unit 320, the second lead-out portion G2, the third circuit element 530, the third lead-out portion G3, the third driving unit 330, the second connecting portion L2, the fourth driving unit 340, the fourth lead-out portion G4, and the second circuit element 520 to form a loop.

As shown in FIG. 2 and FIG. 4, when viewed along the main axis O, the first circuit element 510 is located at the first side portion S1, the second circuit element 520 is located at the third side portion S3, the third circuit element 530 is at least partially located at the first side portion S1 and at least partially at the second side portion S2, and the third circuit element 530 is not located at the third side portion S3. When viewed along a direction that is perpendicular to the main axis O and perpendicular to the first side portion S1, the first circuit 510 and the third circuit 530 at least partially overlap.

Figure 8:
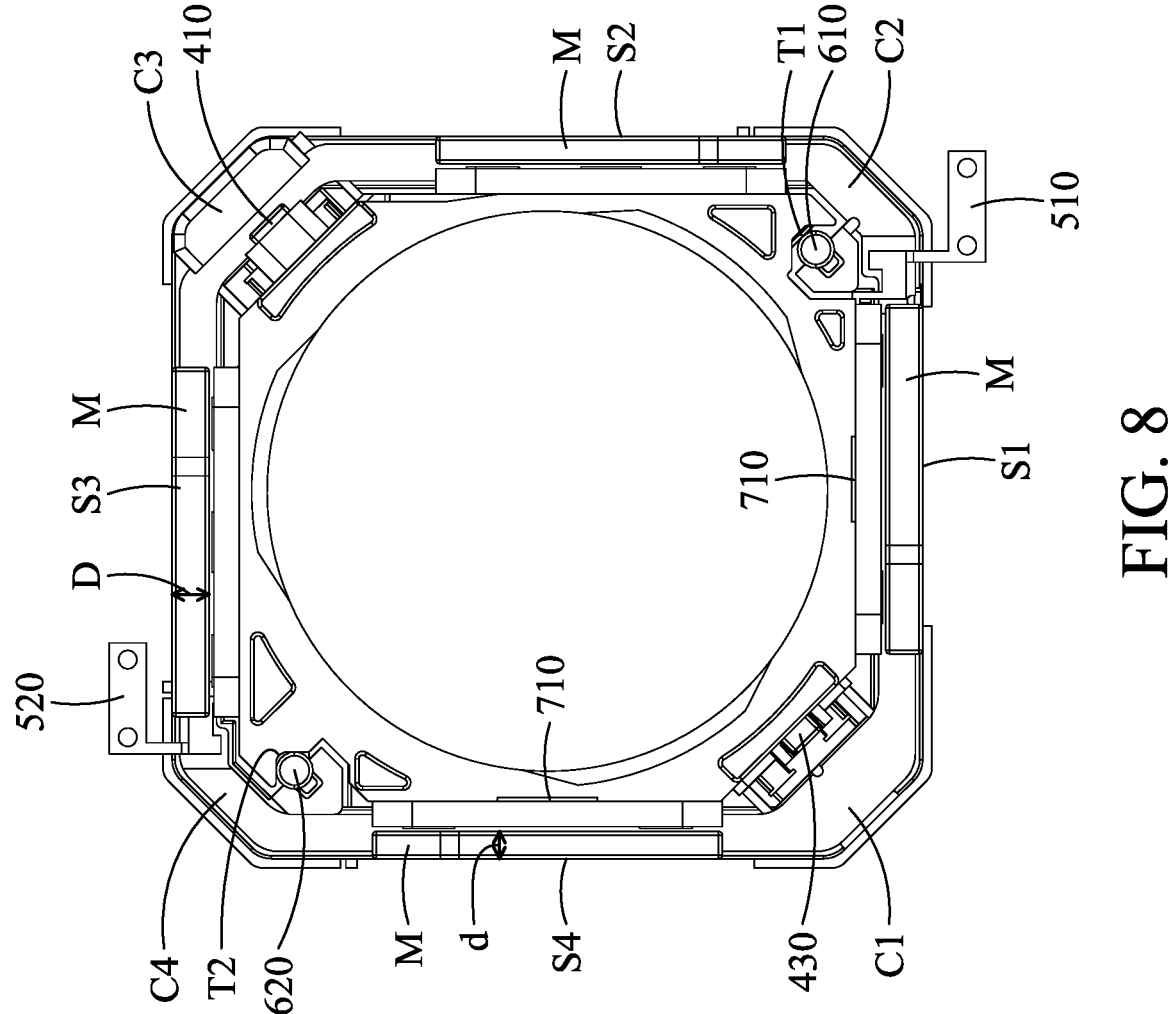
FIG. 8 is a top view of another partial structure of the optical element driving mechanism according to an embodiment of the present invention.
Figure 9:
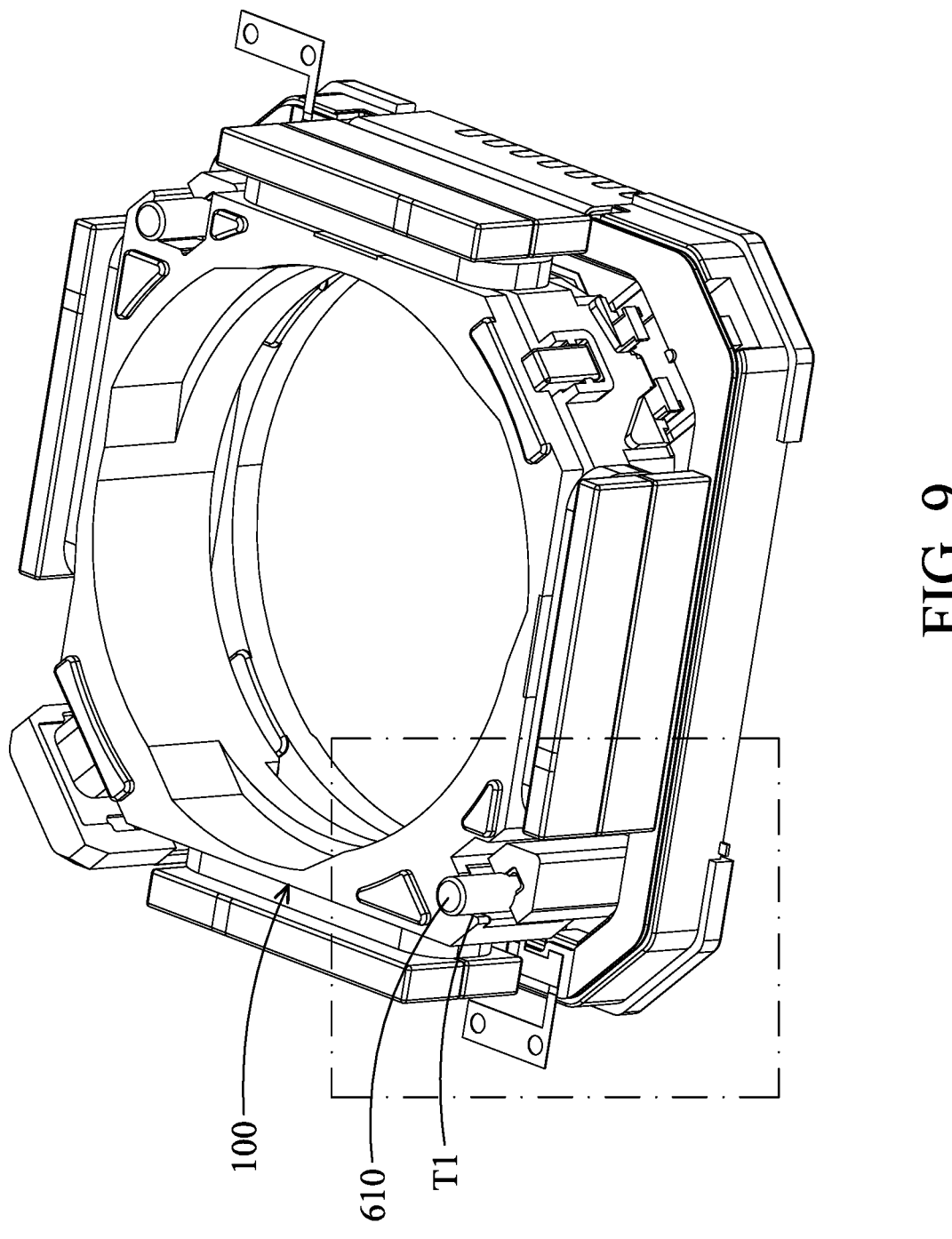
FIG. 9 is a perspective view of another partial structure of the optical element driving mechanism according to an embodiment of the present invention.
Figure 10:
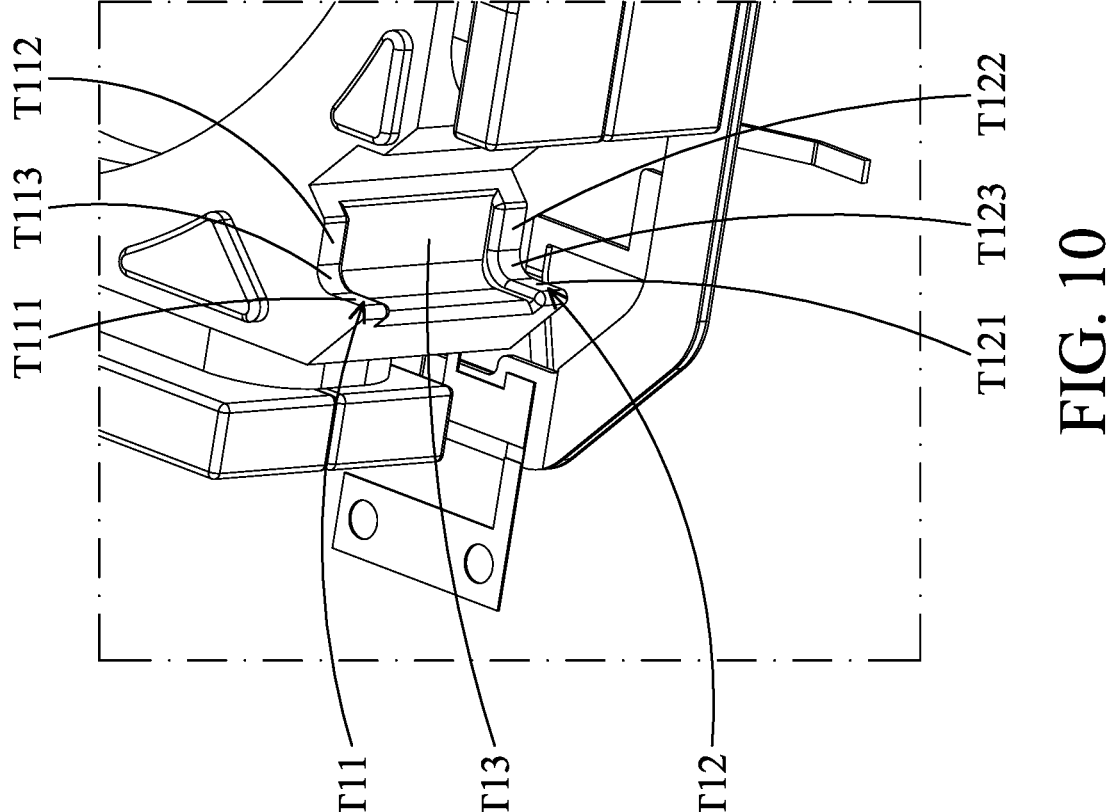
FIG. 10 is a schematic view of a portion framed by a dotted line in FIG. 9.
Figure 11:
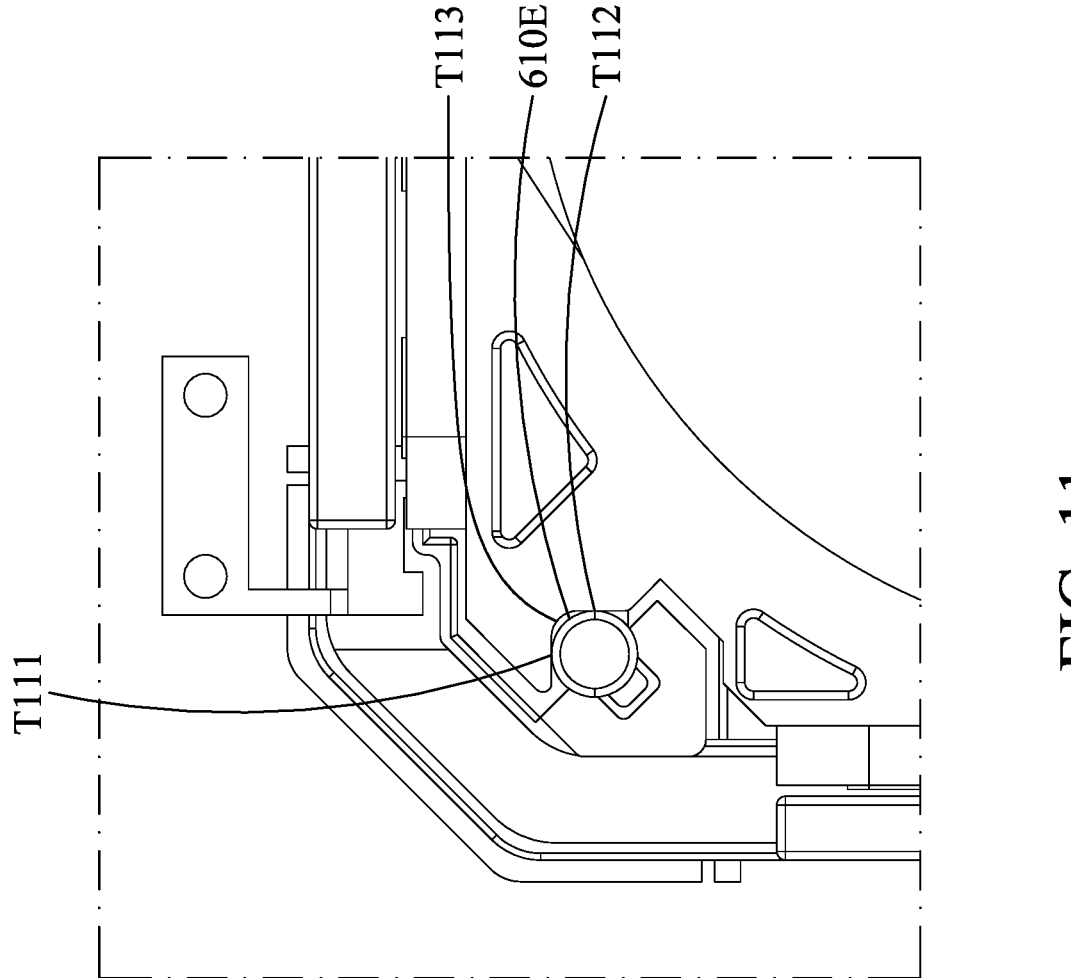
FIG. 11 is a top view of the portion framed by the dotted line in FIG. 9.
Figure 12:
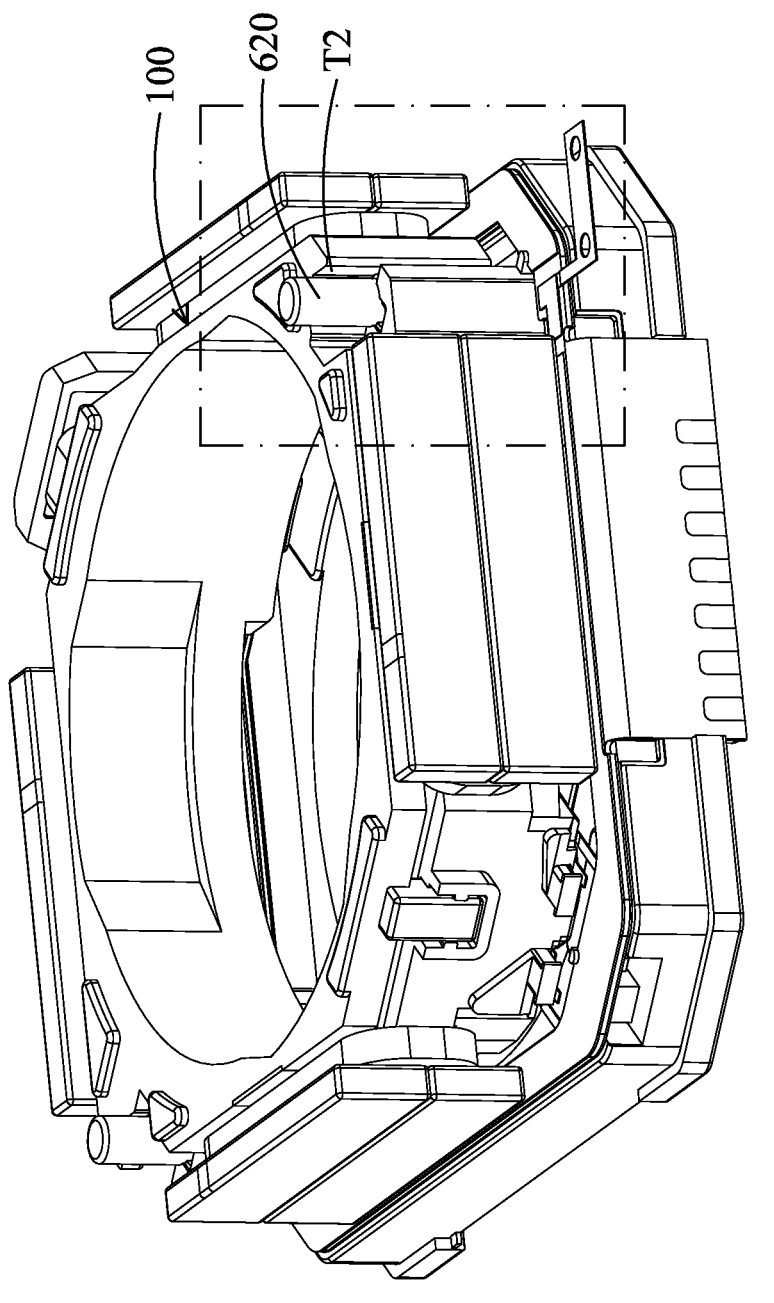
FIG. 12 is another perspective view of another partial structure of the optical element driving mechanism according to an embodiment of the present invention.
Figure 13:
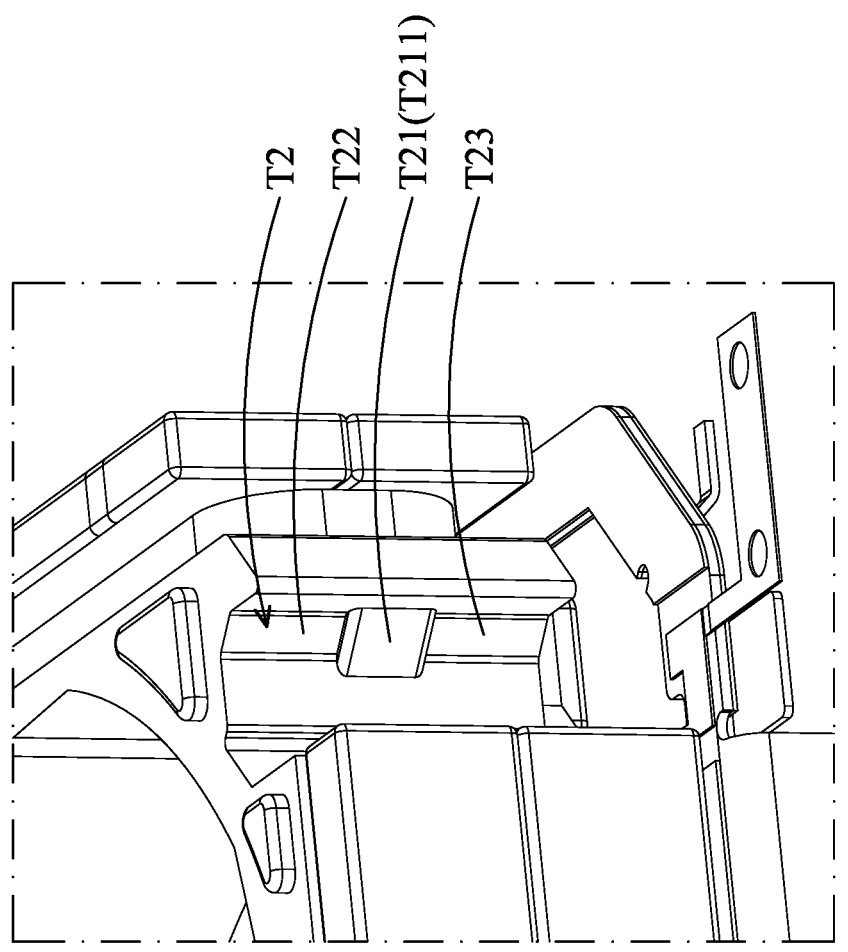
FIG. 13 is a schematic view of a portion framed by a dotted line in FIG. 12.
Figure 14:
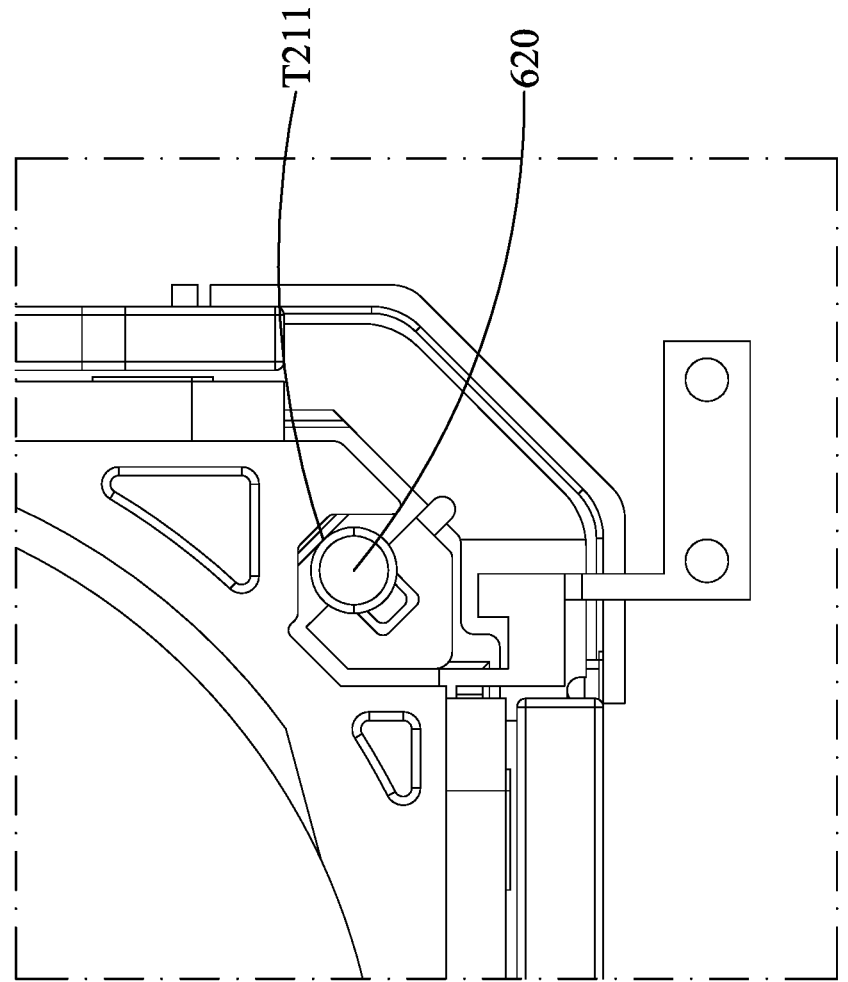
FIG. 14 is a top view of the portion framed by the dotted line in FIG. 12.
Figure 15:
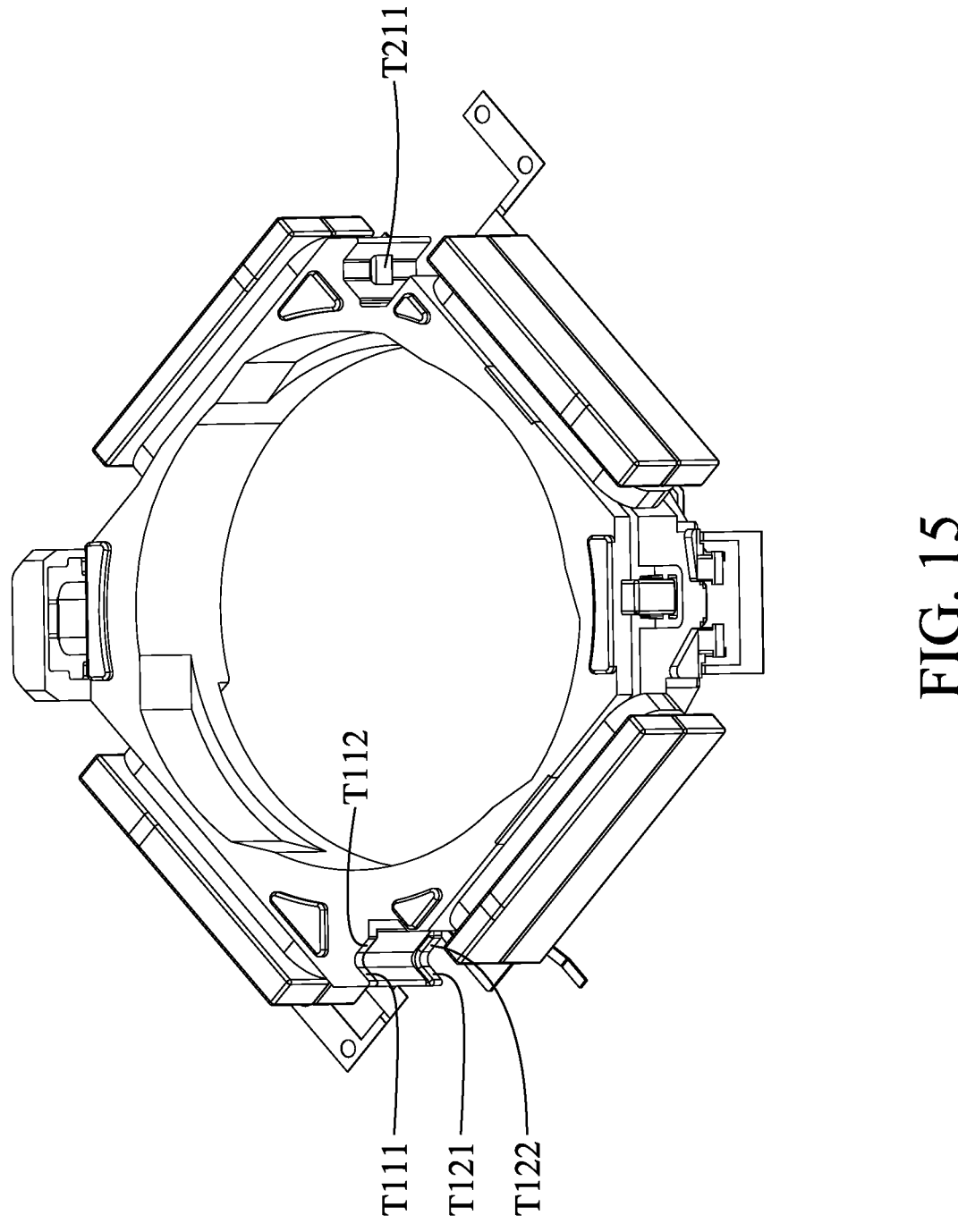
FIG. 15 is a perspective view of one another partial structure of the optical element driving mechanism according to an embodiment of the present invention.

Next, refer to FIG. 2 and FIG. 8 to FIG. 15. FIG. 8, FIG. 9, and FIG. 12 are top view and perspective views from different angles of another partial structure of the optical element driving mechanism 1 according to an embodiment of the present invention. FIG. 10 is a schematic view of a portion framed by a dotted line in FIG. 9. FIG. 11 is a top view of the portion framed by the dotted line in FIG. 9. FIG. 13 is a schematic view of a portion framed by a dotted line in FIG. 12. FIG. 14 is a top view of the portion framed by the dotted line in FIG. 12. FIG. 15 is a perspective view of one another partial structure of the optical element driving mechanism 1 according to an embodiment of the present invention. It should be noted that in FIG. 8 to FIG. 15, the upper cover 210, the frame 230, etc. are omitted to clearly show configuration of main elements, and in FIG. 10, FIG. 13, and FIG. 15, some elements are further omitted to clearly show the configuration of the main elements.

The guiding assembly 600 includes the first guiding element 610, a first contacting element T1, the second guiding element 620, and a second contacting element T2. The movable portion 100 is movable relative to the fixed portion 200 via the guiding assembly 600.

The first guiding element 610 and the second guiding element 620 both have a long strip structure, extend along a direction that is parallel to the main axis O, are arranged in the base 220, and are respectively connected to the two circuit components 550 embedded in the base 220. When viewed along the main axis O, the first guiding element 610 is located at the second corner C2 and the second guiding element 620 is located at the fourth corner C4.

As shown in FIG. 9, the first contacting element T1 corresponds to the first guiding element 610 and is disposed on the movable portion 100. As shown in FIG. 10, the first contacting element T1 includes a first contacting portion T11, a second contacting portion T12, and a first avoidance portion T13. The second contacting portion T12 and the first contacting portion T11 are arranged along a direction that is parallel to the main axis O. The first avoidance portion T13 has a recessed structure, does not contact the first guiding element 610, and is located between the first contacting portion T11 and the second contacting portion T12.

The first contacting portion T11 includes a first contacting surface T111, a second contacting surface T112, and a first curved surface T113. The first contacting surface T111 corresponds to the first guiding element 610. The second contacting surface T112 corresponds to the first guiding element 610 and faces a direction that is different from the first contacting surface T111 faces. The first contacting surface T111 is connected to the second contacting surface T112 via the first curved surface T113.

As shown in FIG. 11, when viewed along the direction that is parallel to the main axis O, the first guiding element 610 has a first arc edge 610E. A radius of curvature of the first arc edge 610E is different from a radius of curvature of the first curved surface T113. In more detail, the radius of curvature of the first arc edge 610E is greater than the radius of curvature of the first curved surface T113, so the first arc edge 610E does not contact the first curved surface T113.

Similar to the first contacting portion T11, the second contacting portion T12 includes a third contacting surface T121, a fourth contacting surface T122, and a second curved surface T123. The third contacting surface T121 corresponds to the first guiding element 610. The fourth contacting surface T122 corresponds to the first guiding element 610 and faces a direction that is different from the third contacting surface T121 faces. The third contacting surface T121 is connected to the fourth contacting surface T122 via the second curved surface T123. When viewed along the direction that is parallel to the main axis O, the radius of curvature of the first arc edge 610E is different from the radius of curvature of the second curved surface T123. In more detail, the radius of curvature of the first arc edge 610E is greater than the radius of curvature of the second curved surface T123, so the first arc edge 610E does not contact the second curved surface T123.

In this embodiment, the first contacting surface T111, the second contacting surface T112, the third contacting surface T121, and the fourth contacting surface T122 may directly contact the first guiding element 610, but the present invention is not limited to this. In some embodiments, the first contacting surface T111, the second contacting surface T112, the third contacting surface T121, and the fourth contacting surface T122 may also be connected to the first guiding element 610 by glue.

As shown in FIG. 12, the second contacting element T2 corresponds to the second guiding element 620 and is disposed on the movable portion 100. As shown in FIG. 13, the second contacting element T2 includes a third contacting portion T21, a second avoidance portion T22, and a third avoidance portion T23. The third contacting portion T21 corresponds to the second guiding element 620. The second avoidance portion T22 has a recessed structure and does not contact the second guiding element 620. The third avoidance portion T23 has a recessed structure and does not contact the second guiding element 620.

The third contacting portion T21 is located between the second avoidance portion T22 and the third avoidance portion T23. As shown in FIG. 14, the third contacting portion T21 further includes a fifth contacting surface T211 corresponding to the second guiding element 620. As shown in FIG. 15, the fifth contacting surface T211 faces a direction that is different from the first contacting surface T111 faces, the second contacting surface T112 faces, the third contacting surface T121 faces, and the fourth contacting surface T122 faces.

In this embodiment, the first contacting element T1 is disposed at the second corner C2 and the second contacting element T2 is disposed at the fourth corner C4, but the present invention is not limited to this. The first contacting element T1 may also be disposed at the fourth corner C4 and the second contacting element T2 may also be disposed at the second corner C2.

As shown in FIG. 2 and FIG. 8, the magnetically permeable assembly 700 includes two magnetically permeable elements 710. The two magnetically permeable elements 710 are magnetically permeable thin sheets, which are disposed on the movable portion 100 and are respectively disposed at the first side portion S1 and the fourth side portion S4. With configuration described above, when the driving assembly 300 drives the movable portion 100 to move relative to the fixed portion 200, the magnetically permeable assembly 700 may enhance magnetic attraction of the movable portion 100 to the first side portion S1 and the fourth side portion S4. Therefore, the movable portion 100 may be closer to the first guiding element 610 and the second guiding element 620, thereby allowing the movable portion 100 to be driven more smoothly.

In this embodiment, as shown in FIG. 8, the optical element driving mechanism 1 has an asymmetric structure. When viewed along the main axis O, a length of the first side portion S1 and the third side portion S3 is longer than that of the second side portion S2 and the fourth side portion S4. In order to maximize space utilization, a thickness D of the magnetic element M disposed at the first side portion S1 and the third side portion S3 is set to be larger than a thickness d of the magnetic element M disposed at the second side portion S2 and the fourth side portion S4, which further increases the magnetic force and improves efficiency of the optical element driving mechanism 1.

In addition, since the second magnetic element 430 disposed at the first corner C1 is closer to the magnetic elements M at its both sides than the first magnetic element 410 disposed at the third corner C3, the overall magnetic force may be balanced and flipping of the holder 100 may be avoided by only using the second magnetic element 430 with a smaller volume.

Furthermore, in this embodiment, the first guiding element 610 and the second guiding element 620 are diagonally disposed at the second corner C2 and the fourth corner C4, respectively. With configuration of the circuit assembly 500 and the driving assembly 300, the lead line may avoid the first guiding element 610 and the second guiding element 620. Therefore, when the movable portion 100 is driven, a breakage probability of the lead line is reduced, thereby increasing service life of the optical element driving mechanism 1.

In summary, embodiments of the present invention provide an optical element driving mechanism, which includes a movable portion, a fixed portion, a driving assembly, and a circuit assembly. The movable portion is connected to the optical element and is movable relative to the fixed portion. The driving assembly drives the movable portion to move relative to the fixed portion. The circuit assembly is electrically connected to the driving assembly. This provides an optical element driving mechanism with an asymmetric structure that can operate stably and achieve maximum efficiency.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, driving an optical element, comprising:

a movable portion, connected to the optical module;

a fixed portion, wherein the movable portion is movable relative to the fixed portion;

a driving assembly, driving the movable portion to move relative to the fixed portion, and comprising:

a first driving unit, having a first lead-out portion;

a second driving unit, having a second lead-out portion;

a third driving unit, having a third lead-out portion;

a fourth driving unit, having a fourth lead-out portion;

a first connecting portion, wherein the first driving unit is electrically connected to the second driving unit through the first connecting portion; and a second connecting portion, wherein the third driving unit is electrically connected to the fourth driving unit through the second connecting portion; and a circuit assembly, electrically connected to the driving assembly, comprising:

a first circuit element, electrically connected to the first lead-out portion;

a second circuit element, electrically connected to the fourth lead-out portion; and a third circuit element, wherein the second lead-out portion is electrically connected to the third lead-out portion through the third circuit element, wherein:

the fixed portion has a main axis and is a polygonal structure, when viewed along the main axis, the first lead-out portion is located between the first driving unit and the second driving unit;

when viewed along the main axis, the first lead-out portion is located at a first corner of the optical element driving mechanism;

wherein when viewed along the main axis, the third lead-out portion is located at a third corner of the optical element driving mechanism;

when viewed along the main axis, the first circuit element is located at a first side portion of the optical element driving mechanism;

when viewed along the main axis, the second circuit element is located at a third side portion of the optical element driving mechanism; and when viewed along the main axis, the third circuit element is at least partially located at the first side portion.

2. The optical element driving mechanism as claimed in claim 1, wherein:

when viewed along the main axis, the second lead-out portion is located between the first driving unit and the second driving unit;

when viewed along the main axis, the first connecting portion is located between the first driving unit and the second driving unit;

when viewed along the main axis, the second lead-out portion is located at the first corner;

when viewed along the main axis, the first connecting portion is located at the first corner.

3. The optical element driving mechanism as claimed in claim 1, wherein:

when viewed along the main axis, the fourth lead-out portion is located at the third corner;

when viewed along the main axis, the second connecting portion is located at the third corner.

4. The optical element driving mechanism as claimed in claim 1, further comprises a position sensing assembly that senses a movement of the movable portion relative to the fixed portion, comprises:

a first reference element;

a first sensing element, corresponding to the first reference element; and a balancing element, wherein:

the first reference element is a first magnetic element;

the balancing element is a second magnetic element.

5. The optical element driving mechanism as claimed in claim 4, wherein a volume of the first magnetic element is larger than a volume of the second magnetic element.

6. The optical element driving mechanism as claimed in claim 4, wherein:

when viewed along the main axis, the first magnetic element is located at the third corner;

when viewed along the main axis, the second magnetic element is located at the first corner.

7. The optical element driving mechanism as claimed in claim 6, wherein when viewed along a direction that is perpendicular to the main axis, the second connecting portion does not overlap the first magnetic element.

8. The optical element driving mechanism as claimed in claim 6, wherein when viewed along a direction that is perpendicular to the main axis, the first connecting portion at least partially overlaps the second magnetic element.

9. The optical element driving mechanism as claimed in claim 6, wherein when viewed along the main axis, the first connecting portion is at least partially located between the second magnetic element and the movable portion.

10. The optical element driving mechanism as claimed in claim 1, wherein:

the first circuit element, the second circuit element and the third circuit element all have plate-like structures;

when viewed along a direction that is perpendicular to the main axis and perpendicular to the first side portion, the first circuit element and the third circuit element at least partially overlap;

when viewed along the main axis, the third circuit element is not located at the third side portion.

11. The optical element driving mechanism as claimed in claim 1, wherein electric current is input from the first circuit element and sequentially flows through the first lead-out portion, the first driving unit, the first connecting portion, the second driving unit, the second lead-out portion, the third circuit element, the third lead-out portion, the third driving unit, the second connecting portion, the fourth driving unit, the fourth lead-out portion, and the second circuit element.

12. The optical element driving mechanism as claimed in claim 1, further comprises a guiding assembly, wherein the movable portion is movable relative to the fixed portion through the guiding assembly, the guiding assembly comprises:

a first guiding element, having a long strip structure, extending in a direction that is parallel to the main axis, located at a second corner of the optical element driving mechanism when viewed along the main axis;

a first contacting element, corresponding to the first guiding element, disposed on the movable portion;

a second guiding element, having a long strip structure, extending in a direction that is parallel to the main axis, located at a fourth corner of the optical element driving mechanism when viewed along the main axis; and a second contacting element, corresponding to the second guiding element, disposed on the movable portion, wherein:

the second corner and the fourth corner are opposite to each other;

the first side portion is located between the first corner and the second corner.

13. The optical element driving mechanism as claimed in claim 12, wherein the first contacting element comprises:

a first contacting portion;

a second contacting portion, arranged with the first contacting portion along a direction that is parallel to the main axis; and a first avoidance portion, having a recessed structure, being not in contact with the first guiding element, located between the first contacting portion and the second contacting portion.

14. The optical element driving mechanism as claimed in claim 13, wherein the first contacting portion comprises:

a first contacting surface, corresponding to the first guiding element;

a second contacting surface, corresponding to the first guiding element, facing a direction that is different from the first contacting surface faces; and;

a first curved surface, the first contacting surface is connected to the second contacting surface via the first curved surface;

wherein when viewed along the direction that is parallel to the main axis, the first guiding element has a first arc edge, and a radius of curvature of the first arc edge is different from a radius of curvature of the first curved surface.

15. The optical element driving mechanism as claimed in claim 14, wherein the radius of curvature of the first arc edge is greater than the radius of curvature of the first curved surface.

16. The optical element driving mechanism as claimed in claim 14, wherein the second contacting element comprises:

a third contacting portion, corresponding to the second guiding element;

a second avoidance portion, having a recessed structure, being not in contact with the second guiding element; and a third avoidance portion, having a recessed structure, being not in contact with the second guiding element, wherein the third contacting portion is located between the second avoidance portion and the third avoidance portion.

17. The optical element driving mechanism as claimed in claim 16, wherein:

the third contacting portion further comprises a fifth contacting surface corresponding to the second guiding element;

the fifth contacting surface faces a direction that is different from the first contacting surface faces;

the fifth contacting surface faces the direction that is different from the second contacting surface faces.

\* \* \* \* \*